(12) United States Patent
Morrison et al.

(10) Patent No.: US 6,733,907 B2
(45) Date of Patent: May 11, 2004

(54) HYBRID CERAMIC MATERIAL COMPOSED OF INSULATING AND STRUCTURAL CERAMIC LAYERS

(75) Inventors: Jay A. Morrison, Oviedo, FL (US); Michael A. Burke, Pittsburgh, PA (US); Gary B. Merrill, Orlando, FL (US); Jay E. Lane, Murrysville, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/963,278

(22) Filed: Sep. 26, 2001

(65) Prior Publication Data

US 2003/0207155 A1 Nov. 6, 2003

Related U.S. Application Data

(60) Continuation-in-part of application No. 09/507,794, filed on Feb. 22, 2000, which is a division of application No. 09/428,197, filed on Oct. 27, 1999, now Pat. No. 6,287,511, which is a division of application No. 09/049,328, filed on Mar. 27, 1998, now Pat. No. 6,013,592.

(51) Int. Cl.[7] .................................................. B32B 9/00
(52) U.S. Cl. .................... 428/699; 428/213; 428/698; 428/701; 428/702; 428/704; 428/408; 416/241 B
(58) Field of Search ............................... 428/698, 699, 428/700, 701, 702, 704, 408, 332, 312.2, 317.9, 312.8; 416/241 B (56) References Cited

U.S. PATENT DOCUMENTS

| | | |
|---|---|---|
| 4,423,097 A | 12/1983 | Mons et al. |
| 4,450,184 A | 5/1984 | Longo et al. |
| 4,530,884 A | 7/1985 | Erickson et al. |
| 4,639,388 A | 1/1987 | Ainsworth et al. |
| 4,917,960 A | 4/1990 | Hornberger et al. |
| 4,923,747 A * | 5/1990 | McCullough et al. .... 428/312.6 |
| 5,064,727 A | 11/1991 | Naik et al. |
| 5,080,934 A | 1/1992 | Naik et al. |
| 5,387,299 A * | 2/1995 | Singh et al. ............. 156/89.26 |
| 5,705,231 A | 1/1998 | Nissley et al. |
| 5,709,919 A | 1/1998 | Kranzmann et al. |
| 5,759,932 A | 6/1998 | Sangeeta et al. |
| 5,780,146 A | 7/1998 | Mason et al. |
| 5,962,076 A | 10/1999 | Mason et al. |
| 5,985,368 A | 11/1999 | Sangeeta et al. |
| 5,985,470 A * | 11/1999 | Spitsberg et al. ........... 428/689 |
| 6,013,592 A | 1/2000 | Merrill et al. |
| 6,071,628 A | 6/2000 | Seals et al. |
| 6,106,959 A * | 8/2000 | Vance et al. ................ 428/623 |
| 6,197,424 B1 | 3/2001 | Morrison et al. |
| 6,235,370 B1 | 5/2001 | Merrill et al. |
| 6,296,945 B1 * | 10/2001 | Subramanian .............. 428/469 |
| 2002/0110698 A1 * | 8/2002 | Singh ......................... 428/472 |

FOREIGN PATENT DOCUMENTS

WO    WO 0146084    6/2001

* cited by examiner

Primary Examiner—Deborah Jones
Assistant Examiner—G. A. Blackwell-Rudasill (57) ABSTRACT

A hybrid ceramic structure (10), for use in high temperature environments such as in gas turbines, is made from an insulating layer (12) of porous ceramic that is thermally stable at temperatures up to 1700° C. bonded to a high mechanical strength structural layer (8) of denser ceramic that is thermally stable at temperatures up to 1200° C., where optional high temperature resistant adhesive (9) can bond the layers together, where optional cooling ducts (11) can be present in the structural layer and where hot gas (14) can contact the insulating layer (12) and cold gas (15) can contact the structural layer (8).

31 Claims, 5 Drawing Sheets

| | FIG. 7A |
|---|---|
| | FIG. 7B |

FIG. 7

Comparison of Hybrid Ceramic/CMC to Alternate Approaches

Convection Heat Transfer Conditions: HTC hot = 5000 W/m²K; T hot = 1600°C; T coating = 500°C

| | Hybrid Ceramic/CMC-based | | | TBC/Superalloy-based | | | Ceramic/CMC-based | | |
|---|---|---|---|---|---|---|---|---|---|
| Example | 1 | 2 | 3 | 4 | 5 | 6 | 7 | 8 | 9 |
| Property | Hybrid CMC A | Hybrid CMC B | Hybrid Monolithic Ceramic | Superalloy w/ 0.3 mm TBC | Thin Superalloy w/ 0.3 mm TBC | Thin Superalloy w/ Thick 2.0 MM TBC | Uncoated Oxide-based CMB | Uncoated SIC-based CMC | Thin SIC-based CMC w/ conventional TBC |
| Maximum Substrate Temp. °C | 1200 | 1100 | 1300 | 950 | 950 | 950 | 1550 | 1500 | 1200 |
| Substrate Kth W/mR | 2 | 3 | 12 | 15 | 15 | 15 | 2 | 12 | 12 |
| Substrate Thickness, mm | 4 | 4 | 3 | 3 | 1 | 3 | 3 | 3 | 2 |
| Coating Kth, W/mK | 1.25 | 1.25 | 1.5 | 1.5 | 1.5 | 1.5 | 0 | 0 | 1.5 |
| Coating Thickness, mm | 4 | 4 | 2 | 0.3 | 0.3 | 2 | 0 | 0 | 0.3 |

FIG. 7A

Comparison of Hybrid Ceramic/CMC to Alternate Approaches

Convection Heat Transfer Conditions: HTC hot = 5000 W/m²K; T hot = 1600°C; T coating = 500°C

| Example | 1 | 2 | 3 | 4 | 5 | 6 | 7 | 8 | 9 |
|---|---|---|---|---|---|---|---|---|---|
| | Hybrid Ceramic/CMC-based | | | TBC/Superalloy-based | | | Ceramic/CMC-based | | |
| Property | Hybrid CMC A | Hybrid CMC B | Hybrid Monolithic Ceramic | Super-alloy w/ 0.3 mm TBC | Thin Super-alloy w/ 0.3 mm TBC | Thin Super-alloy w/ Thick 2.0 MM TBC | Uncoated Oxide-based CMB | Uncoated SiC-based CMC | Thin SiC-based CMC w/ conventional TBC |
| Maximum Surface Temp. °C | 1576 | 1571 | 1561 | 1275 | 1275 | 1515 | 1550 | 1500 | 1400 |
| Substrate Cold-Side Temp. °C | 965 | 904 | 1251 | 625 | 842 | 865 | 1175 | 1375 | 1033 |
| Coating delta-T, °C | 376 | 471 | 261 | 325 | 325 | 565 | 0 | 0 | 200 |
| Substrate delta-T, °C | 235 | 196 | 49 | 325 | 108 | 85 | 375 | 125 | 167 |
| Substrate Modulus, GPa | 80 | 80 | 300 | 200 | 200 | 200 | 200 | 200 | 300 |
| CTE ppm/°C | 6 | 6 | 3.6 | 15 | 15 | 15 | 5 | 5 | 3.6 |
| CMC stress, Mpa | 51 | 42 | 24 | 439 | 146 | 114 | 169 | 56 | 81 |
| Coating | 100% | 157% | 104% | 13746% | 3911% | 671% | 161% | 277% | 1222% |
| Comments | Baseline: Typical of Proposed CMC shows potential of using low Kth sub-strates | Lower temperature CMC substrates can still be effectively cooled | Hybrid structure can be effectively applied to monolithics also | Typical of static gas path surfaces (e.g., vane platform) | Typical of SOA in thin-walled cast vanes & blades (501G, ATS) | Latest SOA in TBC-not applicable to thin-walled airfoils | These illustrate the futility of trying to cool uncoated CMC's for this environment. Need >1550°C oxide CMC or >1500°C to be feasible. | | Even applying conventional TBC's to the best CMC's will not achieve near the same effect as thick-insulating layers |

FIG. 7B

HYBRID CERAMIC MATERIAL COMPOSED OF INSULATING AND STRUCTURAL CERAMIC LAYERS

This application is a continuation-in-part of co-pending U.S. application Ser. No. 09/507,794, filed Feb. 22, 2000, which in turn is a divisional of U.S. application Ser. No. 09/428,197, filed Oct. 27, 1999 (now U.S. Pat. No. 6,287.511), which in turn is a divisional of U.S. application Ser. No. 09/049,328, filed Mar. 27, 1998 (now U.S. Pat. No. 6,013,592).

BACKGROUND OF THE INVENTION

1. Field of the Invention

The present invention relates generally to high temperature ceramic insulation materials applied to high strength ceramic substrates to form a hybrid structure designed for use in high temperature applications, especially gas turbines. More specifically, a hybrid ceramic structure is disclosed where the thermal insulating material is also thermally stable and erosion resistant and protects the underlying structural material from high temperatures in (for example) a turbine environment.

2. Background Information

Combustion turbines comprise a casing or cylinder for housing a compressor section, a combustion section and a turbine section. A supply of air is compressed in the compressor section and directed unto the combustion section. Fuel enters the combustion section by means of a nozzle. The compressed air enters the combustion inlet and is mixed with the fuel. The air/fuel mixture is then combusted to produce high temperature and high pressure gas. This working gas is then ejected past the combustor transition and injected into the turbine section of the turbine.

The turbine section comprises rows of vanes which direct the working gas to the airfoil portions of the turbine blades. The working gas slows through the turbine section, causing the turbine blades to rotate, thereby turning the rotor. The rotor is also attached to the compressor section thus turning the compressor and also an electrical generator for producing electricity.

A high efficiency of a combustion turbine is achieved by heating the gas flowing through the combustion section to as high a temperature as is feasible. The hot gas, however, heats the various metal turbine components—such as the combustor, transition ducts, vanes, ring segments and turbine blades—that it passes when flowing through the turbine.

Accordingly, the ability to increase the combustion firing temperature is limited by the ability of the turbine components to withstand increased temperatures. Metallic structures within a turbine, whether with or without thermal barrier coatings (TBCs), require cooling. Thin layers of TBCs on the metallic structures are commonly used to protect critical components from premature breakdown due to increased temperatures to which the components are exposed. Generally, TBCs extend the life of critical components by reducing the rate of metal waste (through spalling) by oxidation and protecting underlying high strength structural superalloy substrates from intense heat.

Various cooling methods have been developed to cool turbine hot parts. These methods include open-loop air cooling techniques and closed-loop cooling systems. Both techniques, however, involve significant design complexity, have considerable installation and operating costs, and often carry attendant losses in turbine efficiency. For some applications, steam cooling is also being used which is more expensive and more complicated than air-cooling.

Conventional state-of-the-art first row turbine vanes are fabricated from single-crystal superalloy castings with intricate cooling passages and with external TBCs. Not only are these components expensive to manufacture, but with ever-increasing gas path temperatures, their ability to be effectively cooled is limited. These vanes are subjected to high velocity, high temperature gases under high-pressure conditions.

The TBC coating thickness on the turbine vanes and blades must be limited to prevent residual stress buildup and spallation. Potential coating compositions are generally limited to high expansion materials to minimize thermal expansion mismatch between the TBC and substrate metal. Also, the TBC coating has limited durability due to high thermally induced stresses caused by both the thermal expansion mismatch and metal substrate oxidation.

Currently the state of art TBC technology also is limited to surface temperatures of less than 1200° C. for long term use. Also, current TBC compositions are limited to high coefficient of thermal expansion materials, such as $Z_rO_2$, to minimize the thermal expansion mismatch between the superalloy and the TBC; at temperatures less than 1200° C., these TBCs can sinter to near theoretical density, which can lead to spallation. As stated above active cooling of the components is required.

In Advanced Turbine systems (ATSs), the temperature demands of operation and the limits of ATS state-of-the-art materials, may lead to eventual failure of even the most sophisticated high temperature TBCs. This, in turn, can result in premature failure of the critical components and therefore, potential failure of the turbine, interruption in the power supply and expensive repair costs. It is, therefore, desirable to provide turbine components that can (1) withstand high temperatures without the use of the thermal barrier coatings and (2) which substantially reduce the need for cooling.

Other materials for thermal insulation are fibrous ceramic insulating materials. A major drawback of these materials, however, is that they have low densities which lead to very poor erosion resistance. Therefore, fibrous ceramic insulating materials are inapplicable to high velocity gas flow applications.

Monolithic tiles are another material that could possibly be used for protecting critical components in high temperature conditions. These tiles have good erosion resistance and insulating properties, however, they are susceptible to thermal shock damage and catastrophic failure. It is, therefore, desirable to provide insulating materials that can withstand high temperatures without the use of thermal barrier coatings, fibrous ceramic insulating materials, or monolithic ceramic tiles.

Commercially available ceramic matrix composites (CMCs), for example, were thought to have some potential applications in gas turbines, but they are limited in their exposure to temperatures near 1200° C. for long periods of time, that is, greater than 10,000 hours for gas turbines as needed for power generation. In addition, CMCs cannot be effectively cooled under high temperature conditions (greater than 1400° C.) or high heat flux conditions due to their relatively low thermal conductivity and inability to fabricate intricate cooling passages.

What is needed is a structure to replace prior art TBC coated metal substrates for hot gas path components in turbine engines. Therefore, it is an object of this invention to provide a material structure that can significantly reduce component cooling requirements, that as compared to the prior/current technology can provide a high temperature erosion resistant material, and that can withstand high temperature environments without degradation.

SUMMARY OF THE INVENTION

These and other objects of the invention are accomplished by providing a thermally stable engineered layered ceramic structure, henceforth known as the "Hybrid Ceramic" that operates with two aspects. One being a high temperature resistant insulating layer attached to a second more rigid structural layer. The insulating layer is temperature stable (i.e., microstructurally stable and effectively non-sintering), thermally insulating, low elastic modulus ceramic. The structural layer has a lower temperature stability compared to the insulating layer but is mechanically load bearing with a higher elastic modulus than the insulating layer. The proposed system functions similarly to a conventional TBC coated superalloy system but has many more advantages.

The hybrid ceramic is designed to operate under high heat flux conditions with the insulating layer exposed to high temperature gases or other fluid media and with cooling applied to the structural member through cooling fluid means. Thus the system operates under a thermal gradient with the insulating layer having a significantly higher temperature than the cooled structural member. The specific design of the hybrid system is such that the structural member is maintained at a sufficiently low temperature where its mechanical properties are adequate for the load bearing requirements of the application and its microstructural stability is maintained for the desired lifetime of the component.

The hybrid ceramic system of the present invention system is of a compatible ceramic composition. Thus the thermo-mechanical mismatch between the structural layer and the insulating layer is minimized, meaning that the insulating layer in the hybrid ceramic can be much thicker than the insulating ceramic layer of typical TBC/metal structures. Thus, much greater thermal protection is provided to the substrate material, allowing the use of lower temperature capable structural materials in the same high temperature environment (for example, using a 1200° C. capable CMC in a >1600° C. environment).

Another feature of the present invention is that the insulating layer is not as limited in material selection and capability as that for conventional metal/TBC systems and can, thus, be comprised of a material with much higher temperature stability. This capability means that the present invention provides the capability to withstand much higher temperatures than conventional metal/TBC systems can withstand. The thermal stability of the insulating layer is a key feature of the invention, minimizing stresses resulting from sintering shrinkage strains and maintaining the integrity of the insulating layer and thus the integrity of the hybrid ceramic structure over an extended operating life.

A further feature of the present invention is that the structural layer material is comprised of a ceramic rather than a metal so that it can also impart improved thermal properties, in the form of increased thermal resistance. This capability, which allows the use of low thermal conductivity structural layers such as oxide—oxide CMC materials, reduces the heat withdrawal from the engine system, thereby reducing cooling air needs and increasing the power output and thermal efficiency of the engine.

Yet another feature is that the insulating layer material can be selected to be preferentially abradable so that the hybrid system can be use as an abradable sealing component for the ends of the blades.

A preferred embodiment of the invention consists of an underlying structural layer and a protective thermal insulating layer. The structural layer is made of a continuous fiber oxide—oxide ceramic matrix composite that is microstructurally stable and possesses long term mechanical strength and durability up to about 1200° C. This layer is of the order of 3 to 10 mm thick or can be thicker depending upon the application.

The thermal insulating layer is comprised of closely packed thermally stabilized (to 1700° C.) ceramic oxide spheres. This layer is of the order of 2 to 5 mm thick or can be thicker depending upon the application. Also, the insulating layer can be comprised of hollow or partially hollow (including porous core) sphere-based structures, the walls of which are sufficiently thin to impart excellent abradability to the system. This hybrid structure of the present invention has the inherent advantage that it can withstand exposure to hot gas temperatures close to 1700° C. (i.e. greatly in excess of conventional systems). It can be engineered by controlling the relative thickness of the structural layer and the insulating layer so that the thermal protection afforded to the structural layer is of several hundred centigrade degrees (of the order of 200 to 700 centigrade degrees for high heat flux turbine applications). The structural material, therefore, operates well within the regime of its long term mechanical capabilities.

Although the optimum properties are provided by this specific combination of material, specifically required subsets of these properties can be generated using other coatings and substrates. The invention can employ alternative substrate materials and alternative coatings to yield similarly functioning thermo-mechanical ceramic hybrid systems.

This invention provides hybrid ceramic structure that enables the use of a ceramic composite in application environments, such as gas turbines, where normal materials (including monolithic ceramics or stand-alone CMCs) could not be used. The hybrid ceramic uses the structure of two or more ceramic materials bonded/attached together to present the insulating material to the hot gas environment and the structural material to the colder (cooling medium) environment. This hybrid ceramic exposes the special insulating material to temperatures that cannot be withstood by existing structural ceramic materials, such as ceramic matrix composites or monolithic ceramics. It can significantly reduce component cooling requirements, up to about 90% for gas turbine hot gas path components, as compared to the prior/current technology. The insulating layer can also be engineered to provide a high temperature erosion resistant abradable system, which can withstand high temperature environments that degrade the prior/current technology.

This invention allows (but is not limited to) use of structural layers which are not suitable at temperatures over 1200° C. even though the system is exposed to a 1600° C.–1700° C. environment. Thus, common relatively inexpensive materials such as ceramic matrix composites (CMCs), fibrous ceramics and monolithic ceramic can be utilized as the structural layer, when operating in a turbine environment where the insulating layer is exposed to temperatures from 1400° C. to 1700° C. Preferably, the insulating layer is more than 20% porous, and the structural layer is less than 20% porous. The invention can be applied to several gas turbine components of several types (such as blade and vane airfoils, vane platforms, combustors, ring segments or transitions), as well as a variety of applications wherein high temperature, high hot gas velocities, and/or high heat fluxes are required.

BRIEF DESCRIPTION OF THE DRAWINGS

The invention is further illustrated by the following non-limiting drawings, in which.

DETAILED DESCRIPTION OF THE PREFERRED EMBODIMENTS

Figure 1:
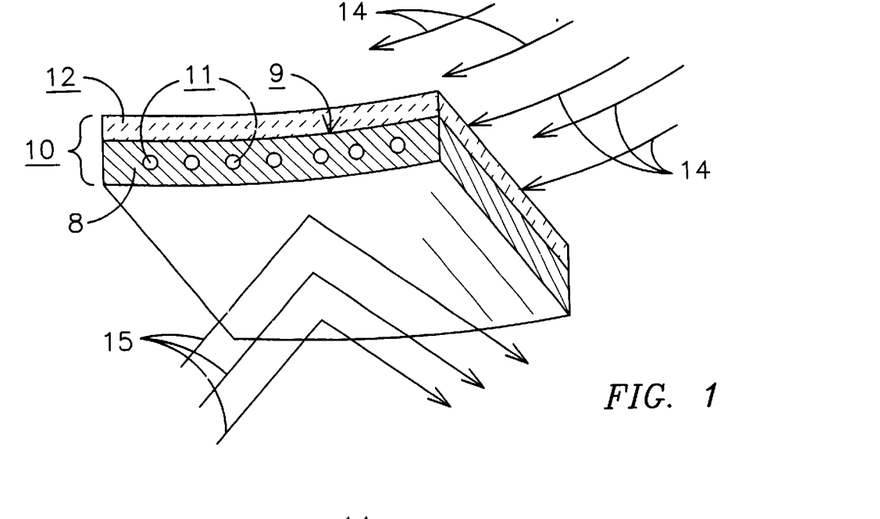
FIG. 1 is an enlarged perspective view depicting a cross section of one embodiment of a hybrid ceramic structure according to the present invention.

The hybrid ceramic structure of the present invention provides a material structure that can completely substitute for TBC coated superalloy materials, in high temperature applications, to provide a low cost high strength material. Referring now to the drawings, there is shown in FIG. 1 an enlarged perspective view of one embodiment of the hybrid ceramic structure 10 according to the present invention. This view shows a cross section of a stable non-sintering ceramic insulating layer 12 placed on a high strength ceramic structural layer 8. The two layers can be self adhering but may also be joined by an optional adhesive along junction 9.

The hybrid structure 10 is shown in slightly concave shape with optional cooling ducts 11, and impinging hot gas flow 14 having a temperature of from about 1400° C. to 1700° C. Optionally a "cooling" gas 15 can contact structural layer 8. For example, the thickness ratio of insulating layer: structural layer can be from about (0.25–3) to (1) preferably from (0.5–1.5) to (1), and here is about 1:1, but can vary based upon the application.

The hybrid ceramic material 10 is comprised of a minimum of two layers, a ceramic insulating layer 12 and a structural ceramic layer 8. The insulating layer 12 has a thickness $\geq 1$ mm, and is also erosion resistant to high velocity gas and particle impact, thermally stable (non-sinterable and environmentally stable) at temperatures greater than 1400° C., has a low thermal conductivity $K_{th}$<4 W/mK (preferably <2 W/mK), and a conductivity/thickness ratio less than 2000 W/m²K. This ceramic insulating layer 12 is bonded to the structural ceramic layer 8 (either monolithic or reinforced with whiskers, platelets, elongated grains, discontinuous or continuous fibers) of higher mechanical strength and lower temperature capability than the insulating layer. The insulating layer 12 has thermal stability greater than 1400° C. and up to 1700° C. and the structural ceramic layer 8 has thermal stability to about 1000° C. and potentially up to 1400° C. The characteristics of the present invention are as stated above for extreme thermal environments wherein the insulating layer 12 is exposed to high fluid temperatures and high heat transfer conditions, and the structural layer 8 is actively cooled to maintain acceptable temperatures.

Figure 2:
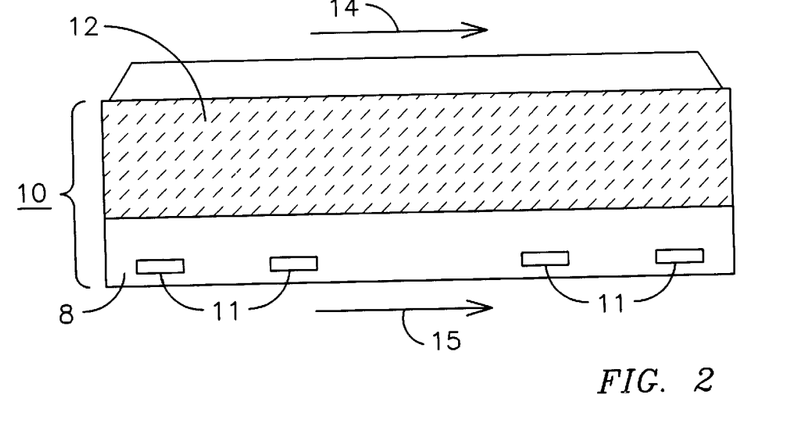
FIG. 2 is a further enlarged perspective view, depicting a cross section, of another embodiment of a hybrid ceramic structure according to the present invention.

FIG. 2 shows a further enlarged perspective view, depicting the cross section of another embodiment of hybrid ceramic structure 10 according to the present invention. Insulating layer 12 is shown thicker here, with a ratio of insulating layer to structural layer of about 1.75:1. Here the structural layer 8 is shown, to form a support system 18 for the thick insulating layer 12. Here optional cooling means 11, such as cooling ducts can be placed within the structural layer 8.

Insulating layer 12 has higher temperature capability and is disposed adjacent to a heat source, and the other structural layer 8, is protected from heat source by layer 12 and is subjected to cooling. The high temperature insulating layer 12 has lower mechanical strength than structural layer 8. Insulating 12 is greater than 1 mm thick—up to 10 mm for some applications (ideally, 2–4 mm); is thermally stable at or near the maximum environmental exposure temperatures; is thermally matched to the structural layer 8, that is, both layers have closely matched coefficients of thermal expansion; has a higher temperature capability; and would have capability up to 1700° C. for gas turbine applications. Furthermore, insulating layer 12 has an elastic modulus E less than that of material 8, that is, $E_{12}$ is less than $E_8$ (optimally, $E_8$ is less than or equal to $0.5E_{12}$); layer 12 has a thermal conductivity lower than or equal to that of layer 8; and for gas turbine applications layer 12 typically has a thermal conductivity less than or equal to 4 W/m-K over the temperature range of interest and preferably less than 2 W/mK. Insulating layer 12 has higher temperature capability and is disposed adjacent to a heat source, and the other structural layer 8, is protected from heat source by layer 12 and is subjected to cooling. The high temperature insulating layer 12 has lower mechanical strength than structural layer 8. Insulating 12 is greater than 1 mm thick—up to 10 mm for some applications (ideally, 2–4 mm); is thermally stable at or near the maximum environmental exposure temperatures; is thermally matched to the structural layer 8, that is, both layers have closely matched coefficients of thermal expansion; has a higher temperature capability; and would have capability up to 1700° C. for gas turbine applications. Furthermore, insulating layer 12 has an elastic modulus E less than that of material 8, that is, $E_{12}$ is less than $E_8$ (optimally, $E_8$ is less than or equal to $0.5E_{12}$); layer 12 has a thermal conductivity lower than or equal to that of layer 8; and for gas turbine applications layer 12 typically has a thermal conductivity less than or equal to 4 W/m-K over the temperature range of interest and preferably less than 2 W/mK. Insulating layer 12 has higher temperature capability and is disposed adjacent to a heat source, and the other structural layer 8, is protected from heat source by layer 12 and is subjected to cooling. The high temperature insulating layer 12 has lower mechanical strength than structural layer 8. Insulating 12 is greater than 1 mm thick—up to 10 mm for some applications (ideally, 2–4 mm); is thermally stable at or near the maximum environmental exposure temperatures; is thermally matched to the structural layer 8, that is, both layers have closely matched coefficients of thermal expansion; has a higher temperature capability; and would have capability up to 1700° C. for gas turbine applications. Furthermore, insulating layer 12 has an elastic modulus E less than that of material 8, that is, $E_{12}$ is less than $E_8$ (optimally, $E_8$ is less than or equal to $0.5E_{12}$); layer 12 has a thermal conductivity lower than or equal to that of layer 8; and for gas turbine applications layer 12 typically has a thermal conductivity less than or equal to 4 W/m-K over the temperature range of interest and preferably less than 2 W/mK.

The characteristics of the insulating layer 12 will now be described in more detail. The insulating layer 12 can be any of a number of structures that achieve low thermal conductivity, $K_{th}$, and low elastic modulus, E, via tailoring of the composition and/or morphology and/or porosity. Also, the insulating layer 12 has a non-sinterable structure achieved through an interconnecting phase or phases of non-sinterable material (such as whiskers, fibers, platelets, acicular particles, or other structure), or through columnar structures wherein the columns are either non-sinterable, non-contacting, or coated with non-sinterable material. A preferred example of a structure having an interconnecting, non-sinterable phase is hollow ceramic spheres or other geometric shapes individually stabilized and subsequently formed into an interconnecting network, or any combinations the foregoing. The ceramic insulating layer does not appreciably densify (<5% change in density) or consolidate (<0.5% linear shrinkage in free-standing condition) during 100 hours of exposure to its maximum intended surface temperature.

The interconnecting and/or thermally stabilizing phase of the insulating layer may be made of stable oxides, including, but not limited to those listed in Table 1.

TABLE 1

| | |
|---|---|
| SIMPLE OXIDES | Alumina, Silica, Zirconia, Hafnia, , Yttria, Titania, Chromia, Baria, Magnesia, Ni oxide, Ca oxide, V oxide, Scandia |
| Rare Earth Oxides | Ceria, Erbia, Ytterbia, and other rare earth oxides |
| Hafnates & Zirconates | Magnesium, Calcium, Strontium, Barium, Lanthanum, Praseodymium and other rare earths |
| Aluminates | YAG, Mg aluminate, Ni aluminate, Ce aluminate, Ca aluminate |
| Silicates | Mullite, Zircon, Ca silicates, Mg silicates, Mg and Ca aluminosilicates |
| Germanates | Yttrium, Zirconium, Hafnium, Cerium |
| Phosphates | Aluminum, Yttrium, Lanthanum |
| Others | Ca tungstate, Zr scandate, |

Such structures could also be fibrous ceramic monoliths, which are typically chopped ceramic fibers bonded together with a minor amount of ceramic powder matrix material; fibrous ceramic monoliths, which are surface hardened (to achieve erosion resistance) through surface densification or which have been surface hardened through the use of surface coatings or laser melting of the surface (glazing). The insulating layer 12 can further be structures with closed or open porosity, or a combination thereof, up to 80% porous, which could be ceramic monoliths or composites that are processed with a fugitive phase such as a fugitive sphere material which burns out during a thermal processing step, such as sintering, firing, or annealing, to form essentially spherical pores, around carbon spheres and burn-out during a firing step. Layer 12 can be ceramic bodies with tailored porosity up to 80% porous achieved through control/modification of particle size distributions of the constituents used to make the body, ceramic bodies formed via direct deposition methods, such as plasma spray, processes which yield controlled density and structure via deposition control or through co-deposition of fugitive and non-fugitive or through physical vapor deposition ("PVD") or chemical vapor deposition ("CVD") which yield columnar structures. Layer 12 can also be foams of up to 80% porosity which may be formed by a variety of methods, for example, deposition upon or conversion of interconnected sponge type structures. The insulating layer 12 may use the material as described in U.S. Pat. No. 6,013,592, and U.S. Pat. No. 6,197,424 both of which are incorporated herein by reference in their entirety, and generally comprises hollow contacting ceramic shapes, such as mullite or stabilized Zirconia microspheres.

As previously stated, structural layer 8 is the major load-carrying member. It consists of structural ceramics, including a material that has discontinuous ceramic reinforcements (that is, whiskers, chopped fibers, particulates, or platelets) in a ceramic powder matrix, continuous ceramic fiber reinforcements in a ceramic matrix, or other ceramic structures, including monolithic ceramics. These materials will generally have temperature capability significantly less than the application's maximum hot gas exposure temperature and may be exposed in actual operation on one side to either active (that is, impingement, convective, effusion, film, etc.) or passive (that's, natural convection or radiation) cooling. Specific examples of the structural layer 8 include, for example from Table 1, oxide matrix composites (for example, Mullite, Aluminosilicate and alumina), Silicon Carbide matrix composites (made by techniques such as chemical vapor infiltration or melt-infiltration), and Silicon Nitride matrix composites (made by means such as reaction bonding, nitriding, hot pressing or pressureless sintering). The matrix of the structural layer 8 is densified in the final product to >50% theoretical density (<50% porosity in the matrix phase). The fibers may or may not be coated with protective or "debonding" interface coatings of the family of C, BN, fugitive layers, sheelite structures, germanates, and similar coatings. Also, the fibers are >25% by volume of the total composite volume of the structural layer.

The structural layer 8 in the preferred embodiment is from the oxide based family of continuous fiber reinforced composites wherein, the matrix of the structural layer is comprised of single or compound oxides of Table 1 formed by any of a variety of methods, including slurry impregnation, vacuum infiltration, pressure casting, chemical vapor infiltration, and other methods known to one skilled in the art. The fibers are comprised of any of the polycrystalline multifilament tows or single crystal monofilaments of alumina, mullite, aluminosilicate, YAG, YAG/alumina eutectics, sapphire. Other fibers can be used as known to one skilled in the art. These composites have the characteristic of having a low through-thickness thermal conductivity (Kth<4 W/mK) at maximum material temperatures, moderate thermal expansion coefficient (CTE >5 ppm/° C.), relatively low elastic modulus (E<150 GPa) and moderate mechanical strength (generally σ<300 MPa in 2D layups).

More specifically, in the preferred embodiment, the structural layer may be made of a ceramic composite made with one or more of the following continuous fibers; Nextel 720 (mullite/alumina), Nextel 610 (alumina), or Nextel 650 (ZrO2-doped alumina). The structural of the CFCC has a matrix predominantly of alumina, mullite, aluminosilicate, and/or lanthanum phosphate (monazite).

Alternatively, the structural ceramic layer can be from the non-oxide-based family of continuous fiber reinforced composites of single or compound metal carbides, nitrides, silicides, or borides, as shown in Table 2 below which are formed by any of a variety of methods, including, but not limited to, chemical vapor infiltration, melt infiltration, reaction forming (nitriding, directed metal oxidation), polymer impregnation & pyrolysis, and other know methods. The matrix of the structural layer may or may not have additional phases (including oxide phases) added as fillers prior to or following primary matrix phase infiltration. Moreover the fibers are comprised of any of the polycrystalline multifilament tows or monofilaments of silicon carbide, silicon carbo-nitride, silicon nitride, and other know substances. The matrix of these composites is densified in the final product to >50% theoretical density (<50% porosity in the matrix phase), including all filler and additional matrix phases. As previously stated, the fibers may be coated with protective and/or "debonding" interface coatings of the family of C, BN, layered SiC, or combinations of these in multiple layers and comprise >25% by volume of the total composite volume.

TABLE 2

| Carbides | Nitrides | Borides | Silicides |
| --- | --- | --- | --- |
| Silicon | Silicon | Molybdenum | Molybdenum |
| Tungsten | Silicon—Carbon (SiCN) | Hafnium | Hafnium |
| Molybdenum | Aluminum | Zirconium | Zirconium |
| Hafnium | Molybdenum | Tantalum | Tantalum |
| Zirconium | Hafnium | Titanium | Titanium |
| Tantalum | Zirconium | Niobium | Niobium |
| Titanium | Tantalum | Chromium | Chromium |
| Niobium | Titanium | Vanadium | |
| Chromium | Niobium | | |
| | Boron | | |

In the case of non-oxide structural ceramic composites, the fiber composites are characterized by relatively high through-thickness thermal conductivity (Kth>4 W/mK), low thermal expansion coefficient (CTE<5 ppm/° C.), relatively high elastic modulus (E>150 GPa), and high mechanical strength (generally σ>250 MPa in 2D lay-ups), although these characteristics are not essential to the function of the hybrid ceramic.

Another aspect of the present invention is that it is preferable to have a ratio of in-plane elastic moduli of the insulating layer 12 to the structural layer 8 between 0.05 and 0.5 (preferably between 0.1 and 0.25) and a ratio of in-plane thermal expansion coefficients of insulating layer and structural layer between 0.5 and 1.2 (preferably between 0.8 and 1.0). Also, variations may be used such as the insulating layer may be made up of multiple layers for the purpose of stress management, thermal expansion grading or tailoring, erosion resistance, etc.

Depending upon the configuration of the hybrid ceramic structure of the present invention, the cooling of the structural layer 8 can be accomplished by convection backside cooling, impingement cooling, internal wall cooling channels or holes, effusion or film cooling via through-thickness holes, or a variety of other cooling means including the combinations of the foregoing that is known to one skilled in the art.

The insulating layer 12 can be attached to structural layer 8, along junction 9, via one or more of the following, for example: mechanical means; direct deposition (CVD, PVD, various plasma spray processes) of 12 onto 8; forming 12 independently and then chemically bonding via high temperature (e.g., phosphate or silicate-based) adhesives to structural layer 8. Insulating layer 12 can be formed jointly with structural layer 8 and co-fired (sintered or otherwise co-processed) together; layer 12 can be formed (for example, via casting) on the structural layer 8 and then fired (sintered or otherwise co-processed) on 8 in a controlled manner; layer 8 can be formed onto the insulating layer 12 directly (via filament winding, tape lay-up, fabric wrapping, etc.) and the structural layer 8 fired (sintered or processed to final density) in-situ, where layer 12 may be a fully densified body, a partially densified body, or a green body prior to forming structural layer 8, or where insulating layer 12 may form part or all of the tooling required for the formation of structural layer 8. Attachment can also be enhanced via use of: surface roughening (grit blasting, etc.); surface area increasing features such as ribs, waves, grooves, and pedestals; and local densification. Attachment can also be accomplished with intermediate layers of graded thermal expansion (intermediate CTE) between insulating layer 12 and structural layer 8; with layer 12 applied directly to layer 8 via slurry-casting; matrix co-infiltration of layer 12 and layer 8; with layer formed directly on layer 12 by a wet lay-up of prepreg fabric, a dry lay-up of fabric, a filament winding of tow or unidirectional tape-wet or dry braiding over structural layer 12 using tooling/mandrel, or metallic braze or solder joining.

Figure 3:
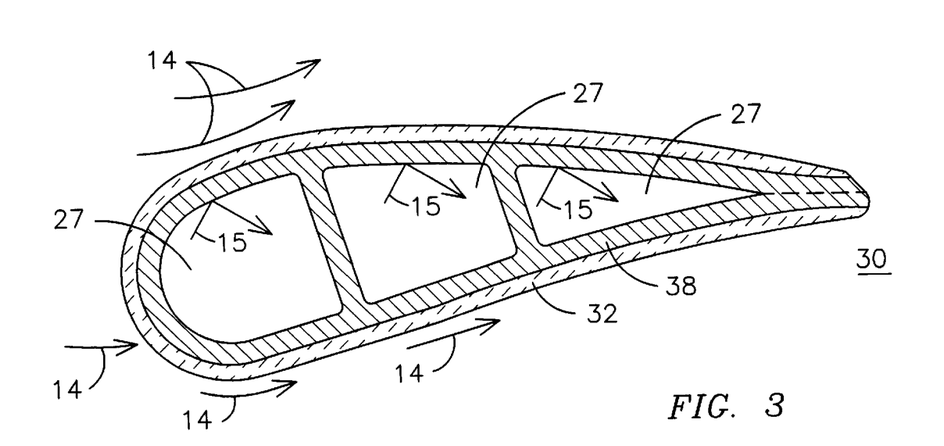
FIG. 3 is a cross-sectional view of a stationary vane utilizing the hybrid ceramic structure of the present invention.

The potential applications for the hybrid ceramic material 10 of the present invention are vast. One application is a stationary vane in a gas turbine where the insulating layer 12 is exposed to temperatures from 1400° C. to 1700° C. FIG. 3 shows a cross-sectional view of a stationary vane 30 with a hybrid ceramic 10 of the present invention. The vane 30 has an structural layer 38, and an insulating layer 32, being exposed to the hot combusted gases, as shown by arrows 14. Optionally, the cooling of the structural layer 38 of the vane 30 is achieved by convection, that is via direct impingement through supply baffles situated in the interior chambers 27 of the vane 30, using air 15 directed from the compressor exit. Use of the hybrid ceramic 10 dramatically reduces the amount of cooling air required to cool a stationary vane 30 in a gas turbine, even without use of cooling ducts in structural layer 38.

Figure 4:
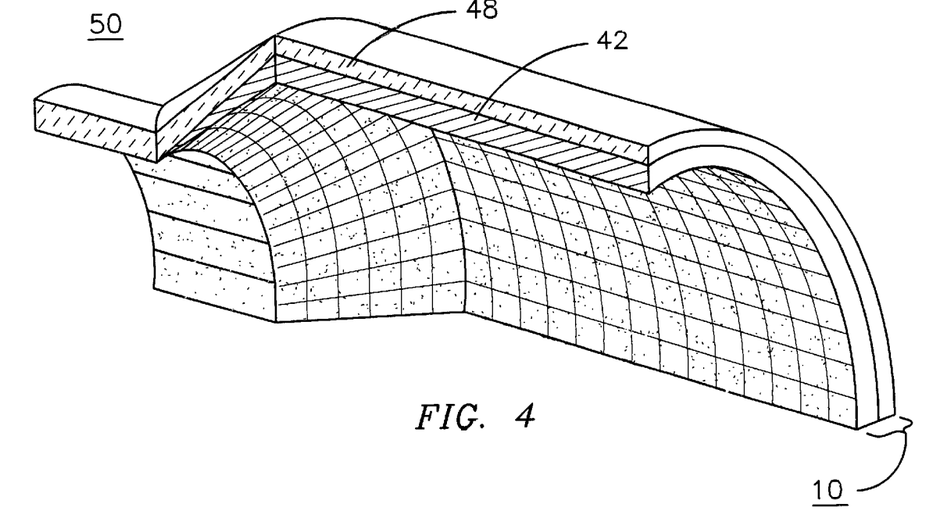
FIG. 4 is a perspective cut-away view of a combustor made with the hybrid ceramic structure of the present invention.

Another embodiment of this invention is the combustor 50 as shown in FIG. 4, made with the hybrid ceramic structure 10 of the present invention. The combustor 50 can be used in a gas turbine where the insulating layer 42 of the hybrid ceramic structure is exposed to temperatures from 1400° C. to 1700° C. The combustor 50 is an axially-symmetric component made entirely from the hybrid ceramic structure 10 of the present invention, showing insulating layer 42 and structural layer 48. The combustor 50 may or may not comprise integral flanges, attachment points, conical sections or other geometric features. Here layer 42 is within the combustor. The design of the combustor 50 is intended to achieve maximum hot surface temperature to stabilize combustion and minimize unwanted emissions so that the insulation layer 42 is shown graded in thickness along the axial length of the combustor to coincide with the combustion flame position and hot gas temperature profile. The ability of the insulating layer 42 to withstand temperatures near 1700° C. means that hot-wall combustion can occur, allowing leaner combustion mixtures, lower overall combustion temperatures, and consequently lower NOx emissions.

Figure 5:
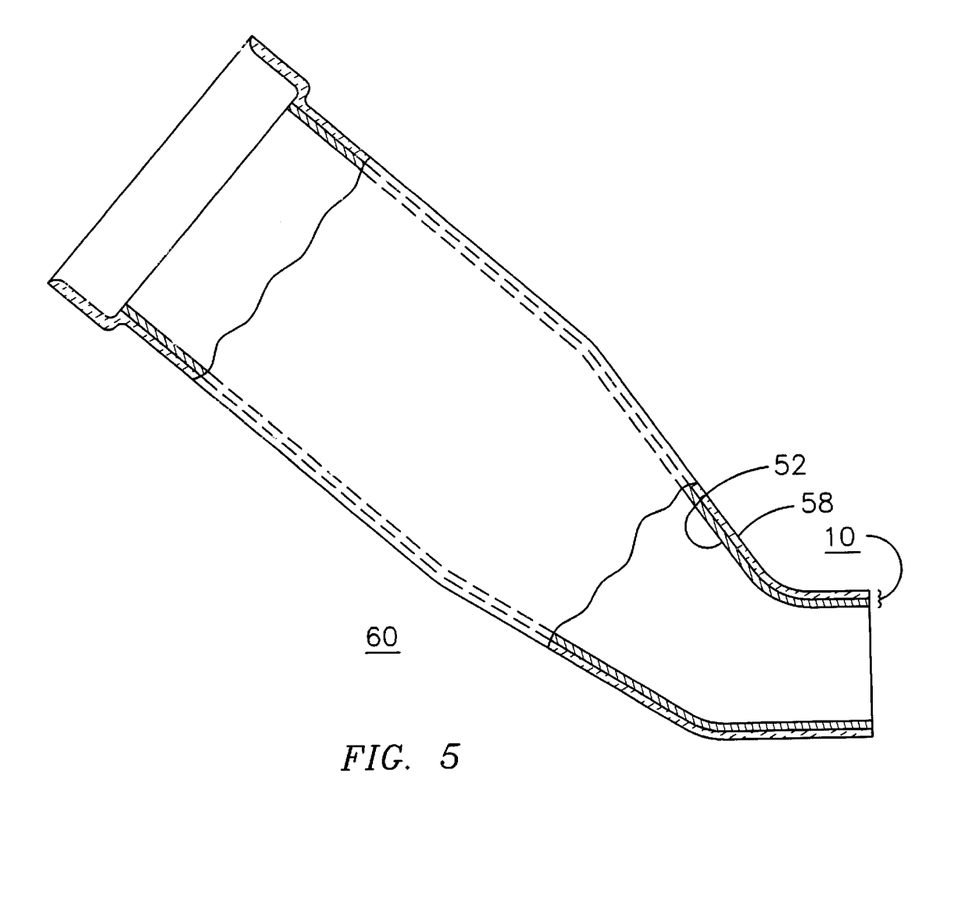
FIG. 5 is a side view of a combustor transition duct having the hybrid ceramic structure of the present invention.

Referring now to FIG. 5, another embodiment of the present invention is a combustor transition duct 60 (or transition) having a surface made entirely of the hybrid ceramic structure 10 of the present invention. The transition duct can be used in a gas turbine where the insulating layer of the hybrid ceramic structure is exposed to temperatures from 1400° C. to 1700° C. The transition 60 comprises a structural member 58 such that hot combustion exhaust gases are in contact only with the insulating layer 52. Here again, layer 52 is inside the combustor transition 60. The ability of the insulating layer 52 to withstand temperatures near 1700° C. means that passive cooling methods can be employed, resulting in lower cost components and increased engine efficiency. The insulating layer 12 thickness may be varied around the component to account for variations in cooling patterns, thus maintaining uniform temperatures of the structural component and minimizing stresses. Higher wall temperatures allowed by use of the hybrid ceramic 10 contribute to reduced emissions of carbon monoxide and unburned hydrocarbons.

Figure 6:
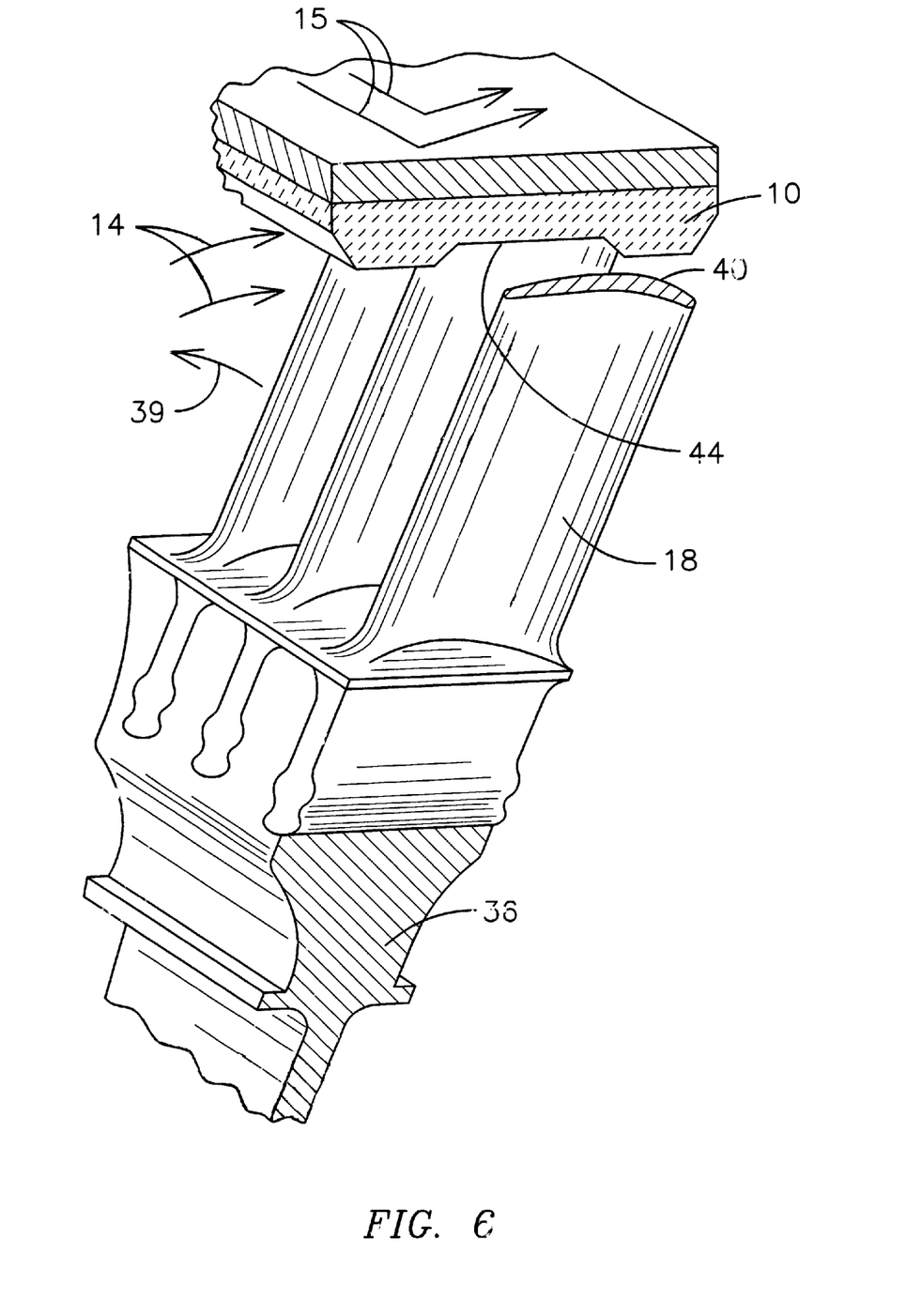
FIG. 6 is a perspective view of a turbine blade tip sealing mechanism utilizing the hybrid ceramic structure.

A further embodiment of the present invention is for abradable seals. The insulating layer of the hybrid ceramic structure 10 can have abradable properties especially when in the lower density range of 10% from to 75% of theoretical density (25–90% porosity) and can be used as a blade tip seal of a gas turbine. FIG. 6 shows a perspective view of the blade tip sealing mechanism. Turbine blades 18 are mounted on a rotor disk 36. The blade tip 40 is located just radially on inside the inner wall 44 of the turbine shroud, which is composed of the hybrid ceramic material 10. During operation, the tips 40 of the rotating blades 18 contact the hybrid ceramic material 10. This contact and the materials 10 abradable form carves precisely-defined grooves in inner wall 44 of the material 10 without contacting the shroud itself and acts as a blade tip seal. The blade 18 and blade tip seal, defined by wall 44, is used in a gas turbine where the insulation layer of the hybrid ceramic structure is abradable and exposed to temperatures from 1400° C. to 1700° C. In addition, the construction or shape of the inner wall 44 of the shroud need not be customized for application of the material 10 of the present invention. Preferably, a typical inner wall 44 having a thickness of 8 mm utilizes a 3 mm thick layer of material 10. Use of the material 10 not only provides a seal for the turbine blade tip 40 with its abradability, but provides insulation for the shroud.

Figure 7:
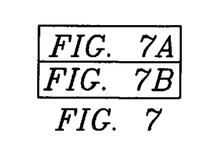
FIG. 7 is a Table that shows results of one dimensional heat transfer calculations under typical gas turbine conditions illustrating the benefits of the hybrid ceramic structure of the present invention.
Figure 7A:
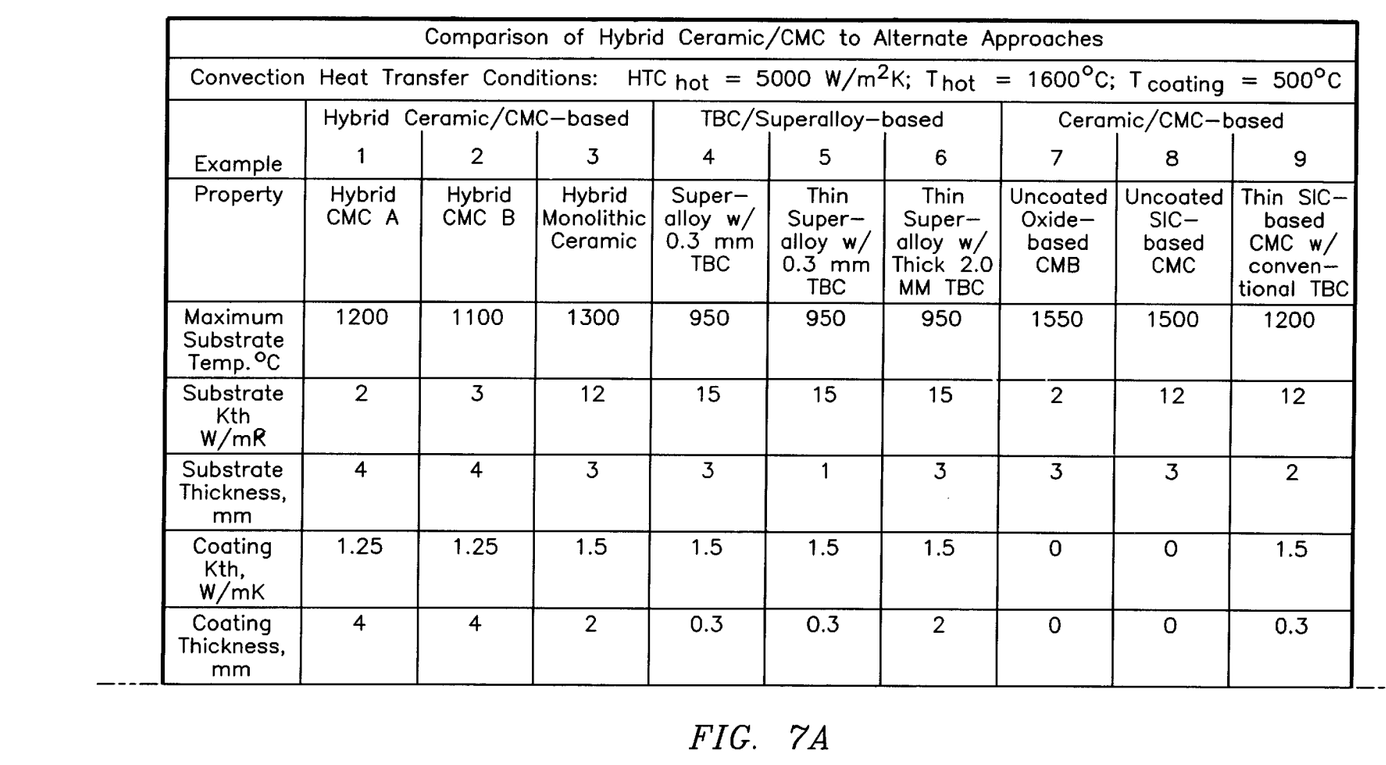
Figure 7B:
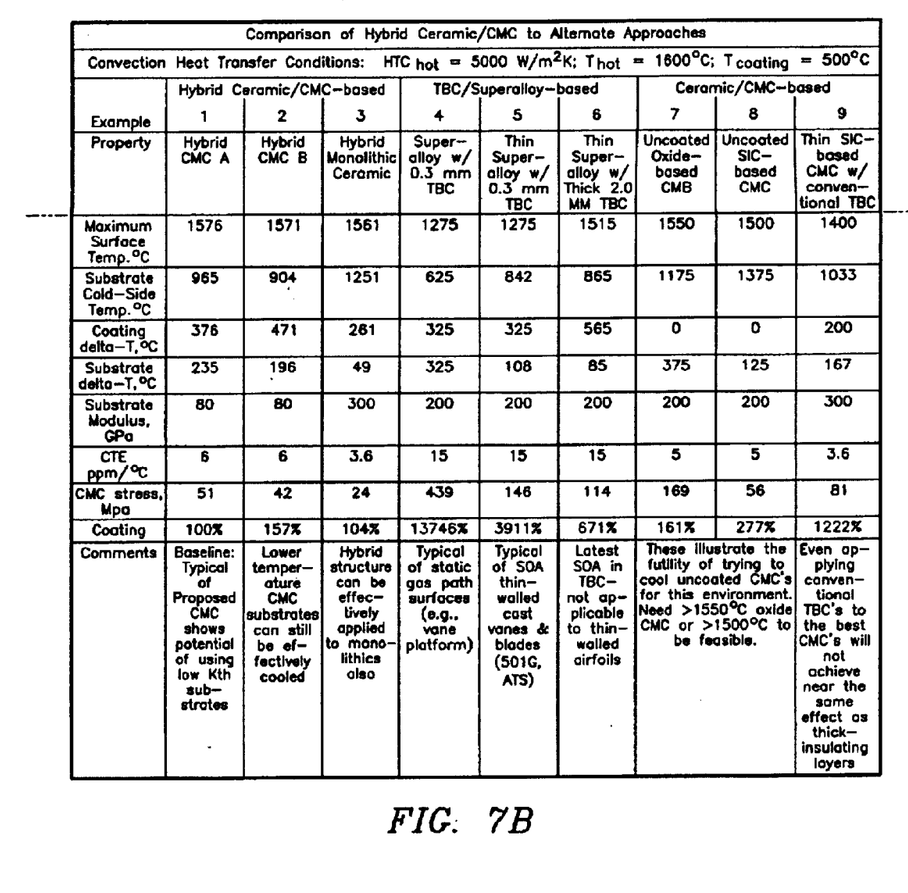

Now referring to FIG. 7, a table is shown that demonstrates the advantages of the hybrid ceramic concept, the subject of this invention, over current and potential approaches using the current state of the art technology in TBCs, superalloys, and non-hybrid ceramics/CMCs. The 100% cooling required in the next to last row for the Hybrid CMC A in column 1 is the baseline condition against which all the other columns are compared to. Note that the only other examples, columns 2 and 3, that reasonably compare to the baseline (column 1) also use the hybrid concept. Column 1 is based on CMC data derived from a Nextel 720 fiber reinforced alumina matrix composite from COI Ceramics (A-N720).

The TBC/Superalloy-based approaches, Columns 4–6, require large increases in the amount of cooling air to be feasible. Even when using thick layers of conventional TBC coatings (column 6), the superalloys require cooling flows in excess of 6 times that of the hybrid ceramic (column 1). Even under these extreme cooling conditions, the TBC still reaches surface temperatures well above its 1200° C. limit for sintering. Thus the conventional TBC coating life is severely limited. By contrast, the non-sinterable insulating layer on the hybrid ceramic can withstand much higher temperatures without sintering.

The Ceramics/CMC-based approaches, columns 7–9, show that both the uncoated oxide and non-oxide CMCs approaches, columns 7 and 8, require very high temperature CMCs that are not currently available (1550° C. and 1500° C., respectively), even while using substantially higher cooling flows than the hybrid ceramic options. When reasonable ceramic substrate temperature is considered, column 9, the best available non-oxide CMC has very high cooling requirements as compared to the baseline Hybrid CMC A in column 1.

The hybrid ceramic structures of the present invention, compared to thermal carrier coating (TBC) coated superalloys, uninsulated ceramics or ceramic matrix composites (CMCs) and TBC-coated CMCs results in the following advantages: higher temperature capability (the insulating layer thermally protects the structural substrate material and maintains it at a lower temperature); significantly reduced cooling requirements (greater than a 90% reduction versus conventionally cooled, TBC-coated superalloys), which results in reduced thermal stresses, more reliable cooling, less parasitic losses to system efficiency and improved power output (for engines). Other advantages of the hybrid ceramic structures of this invention include: use of lower temperature-capable substrates 8, which have lower cost, provide higher mechanical properties and were previously unusable in high temperature environs. This invention allows use of lower thermal conductivity substrates 8 (due to lower cooling requirements) such as oxide-based materials which can be minimally cooled due to reduced heat fixtures, allows use of ceramic/CMC substrates 8 at lower temperatures, which results in higher reliability, less environmental degradation and better strength, and creep resistance.

As compared to current cooled or uncooled ceramics technology (which is usually silicon-based) the hybrid ceramic structure of the current invention: maintains structural layer temperature less than 1200° C. while exposed to a 1400° C. to 1700° C. environment, provides lower cost (less than 25% of the cost of Melt-Infiltrated-SiC/SiC), improves environmental stability, utilizes a versatile manufacturing process, and increases strain tolerance. As compared to superalloys with TBC, the hybrid ceramic structure of this invention reduces cooling (greater than 90% reduction), which increases efficiency 1–2% nth (resulting in 2–4% fuel savings), increases power output, and reduces emissions.

Applications could include but may not be limited to: high velocity, high temperature, or high heat flux environments, wherein: one side of the material is exposed to the hot environment, and the opposite side (or interior surfaces of the structural member) is exposed to cooler environment, whereby heat transfer to the cooler environment is accomplished via: convection, conduction, radiation or any combination of these. Other applications of the present invention could be where heat transfer is sufficient to maintain structural material to acceptable temperatures when the application, for example is, reciprocating piston engines (diesel & gasoline), etc., aircraft surfaces—exhaust, impinged structures and hypervelocity leading edges, nose tips, etc., and spacecraft and re-entry surfaces.

Now the method of manufacturing the invention will be described in detail. The manufacturing method comprises one or more of the following methods; direct deposition of the insulating layer onto the pre-fired structural ceramic layer (via any of a number of ceramic processing methods known to one skilled in the art); direct deposition, formation, or fabrication of the structural ceramic layer onto a pre-fired ceramic insulating layer; formation of a "green" insulating layer, followed by direct formation of the structural ceramic layer onto the green body and subsequently co-firing them to form an integral structure [herein the term "green" refers to an incomplete state of processing of either the structural ceramic layer or the insulating layer: such stages including wet or semi-dried process condition; fully dried; semi-cured; fully cured, but unfired; fired to an intermediate temperature; or processed to an incomplete level of final density]; formation of a "green" structural ceramic member, followed by direct deposition or formation of the insulating layer onto the green body and subsequently co-firing them to form an integral structure; formation of both insulating and structural layers to final desired density and subsequently bonding or attaching them together. Bonding may be by any of a number of high temperature adhesive methods known to those skilled in the art (e.g., phosphate-based or silica-based ceramic adhesives, sol-gel with or without filler particles, polymer pyrolysis methods, reactive metal processes, and other established bonding methods for ceramics).

It is understood that the surface layers of the insulating layer can be modified to enhance surface properties such as erosion resistance and environmental resistance through the use of established surface materials processing technologies including one or more of the following: preferentially densifying the near surface of the insulating layer through application of additional matrix material; surface densification via laser glazing or other similar form of ultra-high temperature surface treatment; post-process surface densification by secondary coatings where the separate layer formed on the surface specifically for erosion resistance or environmental resistance and where the surface layer is inherently thermally and environmentally stable. The surface layer may or may not be insulating or feature all of the attributes of the basic insulating layer stated above.

The present invention may be embodied in other forms without departing from the spirit or essential attributes thereof, and accordingly, reference should be made to both the appended claims and the foregoing specification as indicating the scope of the invention.

What is claimed is:

1. A hybrid structure for use in high temperature applications, comprising:
   a ceramic insulating layer having a thickness of $\geq 1$ mm, and a thermal conductivity $K_{th} < 4$ W/mK, and having a conductivity/thickness ratio less than 2000 W/m$^2$K, wherein the ceramic insulating layer is thermally stable and non-sinterable at temperatures of at least 1200° C.; and
   a structural ceramic layer wherein the structural ceramic layer has higher mechanical strength and lower temperature capability than the ceramic insulating layer, and wherein the ceramic insulating layer and structural ceramic layer are bonded together.

2. The hybrid structure of claim 1 wherein the ceramic insulating layer has a thermal stability greater than 1500° C. and up to 1700° C. and the structural ceramic layer has thermal stability greater than 1000° C. and up to 1400° C.

3. The hybrid structure of claim 1 wherein the ceramic insulating layer is a non-sinterable structure having an interconnecting phase of non-sinterable material.

4. The hybrid structure of claim 1 wherein the ceramic insulating layer is further characterized by columnar structures wherein the columnar structures are one of the group of non-sinterable, non-contacting, and coated with non-sinterable material.

5. The hybrid structure of claim 1 wherein the ceramic insulating layer is further characterized by hollow ceramic geometric shapes individually stabilized and subsequently formed into an interconnecting network.

6. The hybrid structure of claim 1 wherein the ceramic insulating layer is further characterized in that the ceramic insulating layer does not appreciably densify, (<5% change in density) or consolidates (<0.5% linear shrinkage in free-standing condition,) during 100 hours of exposure to its maximum intended surface temperature of at least 1200° C.

7. The hybrid structure of claim 3 wherein the interconnecting phase of the ceramic insulating layer is comprised of an oxide selected from the group consisting of: Alumina, Silica, Zirconia, Hafnia, Beryllia, Yttria, Titania, Chromia, Baria, Magnesia, Ni oxide, Ca oxide, V oxide, Scandia, Ceria, Erbia, Ytterbia, Magnesium Hafnate, Calcium Hafnate, Strontium Hafnate, Barium Hafnate, Lanthanum Hafnate, Praseodymium Hafnate, Magnesium Zirconate, Calcium Zirconate, Strontium Zirconate, Barium Zirconate, Lanthanum Zirconate, Praseodymium Zirconate YAG, Mg aluminate, Ni aluminate, Ce aluminate, Ca aluminate, Mullite, Zircon, Ca silicates, Mg silicates, Mg aluminosilicate, Ca aluminosilicate, Yttrium Germanate, Zirconium Germanate, Hafnium Germanate, Cerium Germanate, Aluminum Phosphate, Yttrium Phosphate, Lanthanum Phosphate, Ca tungstate, and Zr scandate.

8. The hybrid structure of claim 7 wherein the structural ceramic layer comprises an oxide formed by one of the group consisting of hot pressing, pressureless sintering, hot isostatic pressing, sol-gel, slurry processing, vacuum infiltration, pressure casting, chemical vapor deposition, physical vapor deposition, and reaction processing by directed metal oxidation.

9. The hybrid structure of claim 8 wherein the oxide structural ceramic layer comprises a composite whose matrix contains additives selected from the group consisting of whiskers, platelets, elongated grains, discontinuous fibers and continuos fibers.

10. The hybrid structure of claim 9 wherein the structural ceramic layer contains continuous fibers which are comprised of one of the group of polycrystalline multi-filament tows and single crystal mono-filaments and being formed by a method selected from the group consisting of slurry impregnation, vacuum infiltration, pressure casting, reaction forming and chemical vapor infiltration.

11. The hybrid structure of claim 10 wherein the fibers within the structural ceramic layer are selected from the group consisting of alumina, mullite, aluminosilicate, YAG, YAG/alumina eutectics, and sapphire, and the fibers comprise >25% by volume of the total composite volume of the structural ceramic layer.

12. The hybrid structure of claims 11 wherein the matrix within the structural ceramic layer is densified to >50% theoretical density.

13. The hybrid structure of claims 10 wherein the structural ceramic layer fibers are coated with an interface coatings selected from the group consisting of C, BN, fugitive layers, sheelite structures, monazites, xenotimes, and germanates.

14. The hybrid structure of claims 10 wherein the structural ceramic layer is further characterized having a low through-thickness thermal conductivity, (Kth<4 W/mK at maximum substrate material temperature), a moderate thermal expansion coefficient, (CTE>5 ppm/° C.), a relatively low elastic modulus, (E<150 GPa), and a moderate mechanical strength, ($\sigma$<300 MPa in 2D layups).

15. The hybrid structure of claim 1 wherein the structural ceramic layer is comprised of a non-oxide ceramic of the group of single metal carbides, compound metal carbides, nitrides, suicides, and borides and formed by a method selected from the group of chemical vapor infiltration, melt infiltration, reaction forming, (nitriding, directed metal oxidation), hot pressing, pressureless sintering, hot isostatic pressing, polymer impregnation and pyrolysis.

16. The hybrid structure of claim 15 wherein the non-oxide structural ceramic layer comprises a continuous fiber reinforced composite whose matrix contains additives selected from the group consisting of whiskers, platelets, elongated grains, and discontinuous fibers and being formed by a method selected from the group consisting of slurry impregnation, vacuum infiltration, pressure casting, reaction forming, and chemical vapor infiltration.

17. The hybrid structure of claim 16 wherein the structural ceramic layer contains continuous fibers which are comprised of one of polycrystalline multi-filament tows and single crystal mono-filaments.

18. The hybrid structure of claim 16 wherein the structural ceramic layer comprises a continuous fiber reinforced composite whose matrix is a material selected from the group consisting of; silicon carbide, tungsten carbide, molybdenum carbide, hafnium carbide, zirconium carbide, tantalum carbide, titanium carbide, niobium carbide, chromium carbide, silicon nitride, silicon-carbon nitride, aluminum nitride, molybdenum nitride, hafnium nitride, zirconium nitride, tantalum nitride, titanium nitride, niobium nitride, boron nitride, molybdenum boride, hafnium boride, zirconium boride, tantalum boride,, titanium boride, niobium boride, chromium boride, vanadium boride, molybdenum silicide, hafnium silicide, zirconium silicide, tantalum silicide, titanium silicide, niobium silicide, and chromium silicide.

19. The hybrid structure of claim 18 wherein the structural ceramic layer continuous fiber reinforced composite contains fibers comprised of a material selected from the group consisting of; polycrystalline multi-filament tows, mono-filaments of silicon carbide, mono-filaments of silicon carbo-nitride, and mono-filaments of silicon nitride.

20. The hybrid structure of claim 18 wherein the fibers comprise >25% by volume of the total composite volume of the structural ceramic layer.

21. The hybrid structure of claim 18 wherein the matrix is densified to >50% theoretical density.

22. The hybrid structure of claim 18 wherein the fibers are coated with a protective debonding interface coating selected from a group consisting of C, BN, layered SiC, SiCBN, and any combination thereof.

23. The hybrid structure of claim 18 wherein the structural ceramic layer comprises a through-thickness thermal conductivity of $K_{th}>4$ W/mK, a thermal expansion coefficient of CTE<5 ppm/° C., an elastic modulus of E>150 Gpa, and a mechanical strength of $\sigma>250$ MPa in 2D layups.

24. The hybrid structure of claim 1 wherein a ratio of in-plane elastic moduli of the ceramic insulating layer and the structural ceramic layer is between 0.05 and 0.5.

25. The hybrid structure of claims 1 wherein a ratio of in-plane thermal expansion coefficients of the ceramic insulating layer and the structural ceramic layer is between 0.5 and 1.2.

26. The hybrid structure of claim 1 where the ceramic insulating layer comprises multiple layers of ceramic material.

27. The hybrid structure of claim 26 where the ceramic insulating layer has a surface layer that exhibits improved erosion resistance when compared to the erosion resistance of an underlying layer.

28. The hybrid structure of claim 26 where the ceramic insulating layer comprises at least two layers having differing coefficients of thermal expansion.

29. The hybrid structure of claim 26 where the ceramic insulating layer contains a layer comprising one of a graded composition and a graded porosity.

30. An apparatus for use in high temperature applications, the apparatus comprising:
   a structural layer of ceramic matrix composite material; and
   a ceramic insulating layer disposed over a surface of the structural layer, the ceramic insulating layer comprising a conductivity/thickness ratio less than 2000 W/m²K.

31. The apparatus of claim 30, further comprising the ceramic insulating layer having a thickness of at least 1 mm and a thermal conductivity of less than 4 W/mK.

* * * * *